United States Patent
Shimura

(10) Patent No.: US 11,296,745 B2
(45) Date of Patent: Apr. 5, 2022

(54) MOBILE STATION, RF FRONT-END MODULE FOR MOBILE STATION, AND FRONT-END INTEGRATED CIRCUIT

(71) Applicant: SUMITOMO ELECTRIC INDUSTRIES, LTD., Osaka (JP)

(72) Inventor: Tatsuhiro Shimura, Osaka (JP)

(73) Assignee: SUMITOMO ELECTRIC INDUSTRIES, LTD., Osaka (JP)

(*) Notice: Subject to any disclaimer, the term of this patent is extended or adjusted under 35 U.S.C. 154(b) by 0 days.

(21) Appl. No.: 16/467,130

(22) PCT Filed: Oct. 20, 2017

(86) PCT No.: PCT/JP2017/038057
§ 371 (c)(1),
(2) Date: Jun. 6, 2019

(87) PCT Pub. No.: WO2018/110083
PCT Pub. Date: Jun. 21, 2018

(65) Prior Publication Data
US 2019/0319663 A1    Oct. 17, 2019

(30) Foreign Application Priority Data

Dec. 12, 2016 (JP) .............................. JP2016-240622

(51) Int. Cl.
*H01Q 1/24* (2006.01)
*H04B 1/40* (2015.01)
(Continued)

(52) U.S. Cl.
CPC .................. *H04B 1/40* (2013.01); *H01Q 1/38* (2013.01); *H01Q 3/36* (2013.01); *H01Q 21/065* (2013.01);
(Continued)

(58) Field of Classification Search
CPC ...... H01Q 3/26; H01Q 3/2611; H01Q 3/2617; H01Q 3/30; H01Q 3/34; H01Q 3/36;
(Continued)

(56) References Cited

U.S. PATENT DOCUMENTS

| 5,821,901 A * | 10/1998 | Zagrodnick .......... H01Q 3/2605 342/368 |
| 8,774,737 B2 * | 7/2014 | Mori ..................... H03F 1/0211 455/114.3 |
| 2012/0045999 A1 * | 2/2012 | Ono ..................... H04B 7/0617 455/67.16 |
| 2012/0155341 A1 | 6/2012 | Yamamoto et al. |

(Continued)

FOREIGN PATENT DOCUMENTS

| JP | 2004-215107 A | 7/2004 |
| JP | 2013-055663 A | 3/2013 |

(Continued)

*Primary Examiner* — Trinh V Dinh
(74) *Attorney, Agent, or Firm* — Faegre Drinker Biddle & Reath LLP

(57) ABSTRACT

A mobile station includes: a baseband processor; and an RF front-end module connected to the baseband processor and including a plurality of antenna modules and a controller. The plurality of antenna modules each include an antenna element and a variable phase shifter connected to the antenna element. The baseband processor is configured to output a beam control signal indicating a direction of an antenna beam formed by the plurality of antenna elements. The controller is configured to receive the beam control signal from the baseband processor, determine a phase control amount for each variable phase shifter on the basis of the beam control signal, and control each variable phase shifter on the basis of the determined phase control amount.

5 Claims, 9 Drawing Sheets

(51) Int. Cl.
*H01Q 1/38* (2006.01)
*H01Q 3/36* (2006.01)
*H01Q 21/06* (2006.01)
*H01Q 21/20* (2006.01)
*H04B 7/06* (2006.01)
*H04B 7/08* (2006.01)

(52) U.S. Cl.
CPC ......... *H01Q 21/205* (2013.01); *H04B 7/0617* (2013.01); *H04B 7/086* (2013.01)

(58) Field of Classification Search
CPC ..................... H01Q 3/38; H01Q 21/00; H01Q 21/0006–293; H04B 7/0617; H04B 7/086; H04B 1/40
See application file for complete search history.

(56) References Cited

U.S. PATENT DOCUMENTS

| | | | |
|---|---|---|---|
| 2013/0059620 | A1 | 3/2013 | Cho |
| 2015/0244478 | A1 | 8/2015 | Shirakata et al. |
| 2016/0302208 | A1* | 10/2016 | Sturkovich .......... H04B 7/0617 |
| 2017/0346104 | A1* | 11/2017 | Helms .................. H01M 8/188 |
| 2021/0036404 | A1* | 2/2021 | Lee .......................... H01Q 5/10 |
| 2021/0344383 | A1* | 11/2021 | Pajona ................ H04B 7/0413 |

FOREIGN PATENT DOCUMENTS

| | | | |
|---|---|---|---|
| JP | 2014-165648 A | | 9/2014 |
| JP | 2015/162823 A | | 9/2015 |
| JP | 2016-528794 A | | 9/2016 |
| WO | WO-2011/043298 A1 | | 4/2011 |
| WO | WO 2015/006293 A1 | | 1/2015 |

\* cited by examiner

FIG. 4

REFERENCE TABLE

| BEAM CONTROL SIGNAL (BEAM ANGLE) | PHASE (AMPLITUDE) | | | |
|---|---|---|---|---|
| | $M_{11}$ | $M_{12}$ | ... | $M_{mn}$ |
| 0° | $\theta_{11}^{0}$ | $\theta_{12}^{0}$ | ... | $\theta_{mn}^{0}$ |
| 15° | $\theta_{11}^{15}$ | $\theta_{12}^{15}$ | ... | $\theta_{mn}^{15}$ |
| 30° | $\theta_{11}^{30}$ | $\theta_{12}^{30}$ | ... | $\theta_{mn}^{30}$ |
| 45° | $\theta_{11}^{45}$ | $\theta_{12}^{45}$ | ... | $\theta_{mn}^{45}$ |
| ⋮ | ⋮ | ⋮ | ⋱ | ⋮ |
| 345° | $\theta_{11}^{345}$ | $\theta_{12}^{345}$ | ... | $\theta_{mn}^{345}$ |

FIG. 8

REFERENCE TABLE

| BEAM CONTROL SIGNAL | | PHASE (AMPLITUDE) | | | SWITCH | | |
|---|---|---|---|---|---|---|---|
| HORIZONTAL PLANE BEAM ANGLE | VERTICAL PLANE BEAM ANGLE | $M_{11}$ | ... | $M_{48}$ | $M_{11}$ | ... | $M_{48}$ |
| 0° | 0° | $\theta_{11}^{0\text{-}0}$ | ... | – | ON | ... | OFF |
| | 10° | $\theta_{11}^{0\text{-}10}$ | ... | – | ON | ... | OFF |
| | ⋮ | ⋮ | ⋮ | ⋮ | ⋮ | ⋮ | ⋮ |
| | 80° | $\theta_{11}^{0\text{-}80}$ | ... | – | ON | ... | OFF |
| | 90° | $\theta_{11}^{0\text{-}90}$ | ... | – | ON | ... | OFF |
| 15° | 0° | $\theta_{11}^{15\text{-}0}$ | ... | – | ON | ... | OFF |
| | 10° | $\theta_{11}^{15\text{-}10}$ | ... | – | ON | ... | OFF |
| | ⋮ | ⋮ | ⋮ | ⋮ | ⋮ | ⋮ | ⋮ |
| | 80° | $\theta_{11}^{15\text{-}80}$ | ... | – | ON | ... | OFF |
| | 90° | $\theta_{11}^{15\text{-}90}$ | ... | – | ON | ... | OFF |
| 30° | 0° | $\theta_{11}^{30\text{-}0}$ | ... | – | ON | ... | OFF |
| | 10° | $\theta_{11}^{30\text{-}10}$ | ... | – | ON | ... | OFF |
| | ⋮ | ⋮ | ⋮ | ⋮ | ⋮ | ⋮ | ⋮ |
| | 80° | $\theta_{11}^{30\text{-}80}$ | ... | – | ON | ... | OFF |
| | 90° | $\theta_{11}^{30\text{-}90}$ | ... | – | ON | ... | OFF |
| 45° | 0° | $\theta_{11}^{45\text{-}0}$ | ... | – | ON | ... | OFF |
| | 10° | $\theta_{11}^{45\text{-}10}$ | ... | – | ON | ... | OFF |
| | ⋮ | ⋮ | ⋮ | ⋮ | ⋮ | ⋮ | ⋮ |
| | 80° | $\theta_{11}^{45\text{-}80}$ | ... | – | ON | ... | OFF |
| | 90° | $\theta_{11}^{45\text{-}90}$ | ... | – | ON | ... | OFF |
| ⋮ | ⋮ | ⋮ | ⋮ | ⋮ | ⋮ | ⋮ | ⋮ |
| 345° | 0° | – | ... | $\theta_{48}^{345\text{-}0}$ | OFF | ... | ON |
| | 10° | – | ... | $\theta_{48}^{345\text{-}10}$ | OFF | ... | ON |
| | ⋮ | ⋮ | ⋮ | ⋮ | ⋮ | ⋮ | ⋮ |
| | 80° | – | ... | $\theta_{48}^{345\text{-}80}$ | OFF | ... | ON |
| | 90° | – | ... | $\theta_{48}^{345\text{-}90}$ | OFF | ... | ON |
| ALL | 0° | $\theta_{11}^{ALL\text{-}0}$ | ... | $\theta_{48}^{ALL\text{-}0}$ | ON | ... | ON |
| | 10° | $\theta_{11}^{ALL\text{-}10}$ | ... | $\theta_{48}^{ALL\text{-}10}$ | ON | ... | ON |
| | ⋮ | ⋮ | ⋮ | ⋮ | ⋮ | ⋮ | ⋮ |
| | 80° | $\theta_{11}^{ALL\text{-}80}$ | ... | $\theta_{48}^{ALL\text{-}80}$ | ON | ... | ON |
| | 90° | $\theta_{11}^{ALL\text{-}90}$ | ... | $\theta_{48}^{ALL\text{-}90}$ | ON | ... | ON |

MOBILE STATION, RF FRONT-END MODULE FOR MOBILE STATION, AND FRONT-END INTEGRATED CIRCUIT

TECHNICAL FIELD

The present invention relates to a mobile station that communicates with a mobile communication base station, etc.

This application claims priority on Japanese Patent Application No. 2016-240622 filed on Dec. 12, 2016, the entire contents of which are incorporated herein by reference.

BACKGROUND ART

In mobile communication, communication is performed between a base station and a mobile station. PATENT LITERATURE 1 discloses beam forming by a base station.

CITATION LIST

Patent Literature

PATENT LITERATURE 1: International Publication WO2011/43298

SUMMARY OF INVENTION

An aspect of the present invention is a mobile station. In an embodiment, the mobile station includes: a baseband processor; and an RF front-end module connected to the baseband processor and including a plurality of antenna modules and a controller.

In the embodiment, the plurality of antenna modules each include an antenna element and a variable phase shifter connected to the antenna element.

In the embodiment, the baseband processor is configured to output a beam control signal indicating a direction of an antenna beam formed by the plurality of antenna elements. In the embodiment, the controller is configured to receive the beam control signal from the baseband processor, determine a phase control amount for each variable phase shifter on the basis of the beam control signal, and control each variable phase shifter on the basis of the determined phase control amount.

Another aspect of the present invention is an RF front-end module. Still another aspect of the present invention is a front-end integrated circuit.

BRIEF DESCRIPTION OF DRAWINGS

FIG. 4 is a diagram showing a reference table.

FIG. 5 is diagrams showing an RF front-end module of a second embodiment, wherein FIG. 5(a) is a plan view showing the RF front-end module, FIG. 5(b) is a side view of the module, and FIG. 5(c) is a cross-sectional view of the module.

FIG. 8 is a diagram showing a reference table.

DESCRIPTION OF EMBODIMENTS

Problems to be Solved by Disclosure

Figure 1:
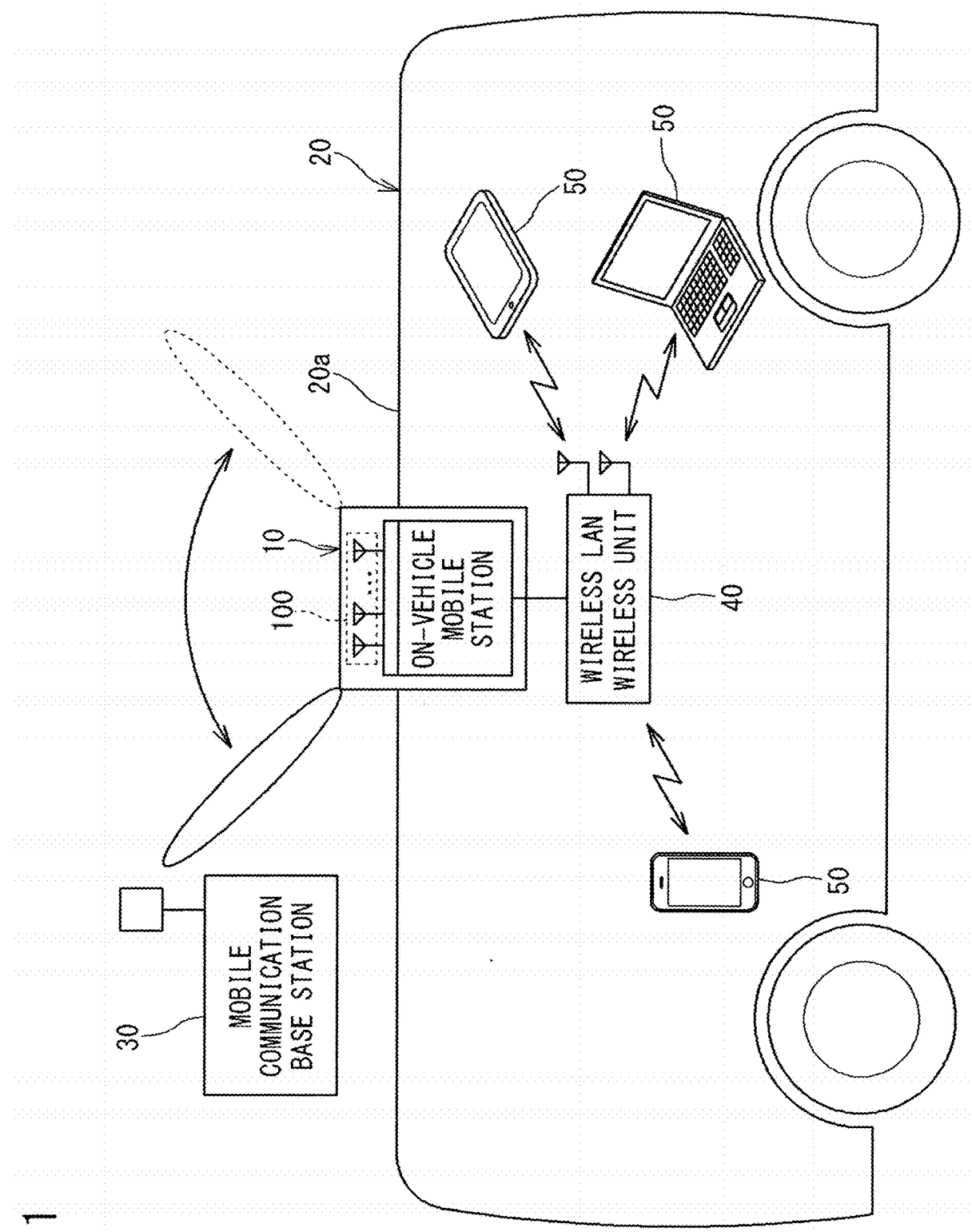
FIG. 1 is a diagram showing a vehicle equipped with a mobile station.

In order to achieve high-speed mobile communication, use of a high frequency such as millimeter waves, submillimeter waves, or the like is desired. However, communication at a high frequency has great propagation loss. In order to compensate for propagation loss and perform stable high-speed communication, not only a base station but also a mobile station is desired to perform beam forming.

Here, the mobile station generally has a baseband processor. The baseband processor is a semiconductor integrated circuit that executes a mobile communication process including a baseband process. The baseband processor is connected to a transmission/reception circuit. The baseband processor provides a generated baseband signal to the transmission/reception circuit and acquires a baseband signal from the transmission/reception circuit.

From the viewpoint of a more appropriate mobile communication process, the baseband processor, which executes the mobile communication process, is desired to control a beam.

However, when the baseband processor controls a beam, an increase in control load on the baseband processor is caused. That is, in order to control a beam, it is necessary to control a plurality of variable phase shifters that are connected to a plurality of antenna elements, respectively, and thus the control load is great. In addition, in order to obtain higher gain, the number of the antenna elements tends to increase, and thus the control load is likely to increase.

Furthermore, in the case where the baseband processor controls many variable phase shifters, the number of control signal lines that connect the baseband processor and the many variable phase shifters to each other is increased, causing an increase in size of the mobile station.

It is desired to inhibit an increase in control load on the baseband processor even when the baseband processor performs beam control.

Advantageous Effects of Disclosure

According to the present disclosure, an increase in control load on the baseband processor can be inhibited even when the baseband processor controls a beam.

1. Outline of Embodiments (1) A mobile station according to an embodiment includes: a baseband processor; and an RF front-end module connected to the baseband processor and including a plurality of antenna modules and a controller, the plurality of antenna modules each include an antenna element and a transmission/reception circuit having a variable phase shifter connected to the antenna element, the baseband processor is configured to output a beam control signal indicating a direction of an antenna beam formed by the plurality of antenna elements, and the controller is configured to receive the beam control signal from the baseband processor, determine a phase control amount for each variable phase shifter on the basis of the beam control signal, and control each variable phase shifter on the basis of the determined phase control amount. According to this configuration, the control of each variable phase shifter is performed by the controller of the RF front-end module, and the baseband processor does not need to control each variable phase shifter. Thus, even when the baseband processor performs beam control, an increase in control load on the baseband processor can be inhibited.

(2) Preferably, the controller selects one or a plurality of antenna modules to be used for communication, from among the plurality of antenna modules, on the basis of the beam control signal, and controls the variable phase shifters of the one or the plurality of antenna modules to be used. In this case, it is possible to change a beam also by selection of antenna modules to be used.

(3) Preferably, the controller determines the phase control amount by referring to a table in which a direction of an antenna beam with a phase control amount for each variable phase shifter are associated with each other. In this case, it is easy to determine the phase control amount.

(4) Preferably, the RF front-end module receives the beam control signal by only one terminal. In this case, a size increase can be prevented.

(5) Preferably, the controller corrects the phase control amount by monitoring a phase of a signal transmitted or received by the antenna element. In this case, the phase control amount can be calibrated by the controller.

(6) An RF front-end module according to an embodiment includes a plurality of antenna modules and a controller, the plurality of antenna modules each include an antenna element and a variable phase shifter connected to the antenna element, and the controller is configured to receive a beam control signal indicating a direction of an antenna beam formed by the plurality of antenna elements, from a baseband processor, determine a phase control amount for each variable phase shifter on the basis of the beam control signal, and control each variable phase shifter on the basis of the determined phase control amount. According to this configuration, the control of each variable phase shifter is performed by the controller of the RF front-end module, and the baseband processor does not need to control each variable phase shifter. Thus, even when the baseband processor performs beam control, an increase in control load on the baseband processor can be inhibited.

(7) An RF front-end module according to an embodiment includes: a substrate; a plurality of antenna elements formed on the substrate; and a front-end integrated circuit provided on the substrate and connected to a baseband processor, the front-end integrated circuit includes a plurality of variable phase shifters provided so as to correspond to the plurality of antenna elements, respectively, and a controller, and the controller is configured to receive a beam control signal indicating a direction of an antenna beam formed by the plurality of antenna elements, from the baseband processor, determine a phase control amount for each variable phase shifter on the basis of the beam control signal, and control each variable phase shifter on the basis of the determined phase control amount. According to this configuration, the control of each variable phase shifter is performed by the controller of the front-end integrated circuit, and the baseband processor does not need to control each variable phase shifter. Thus, even when the baseband processor performs beam control, an increase in control load on the baseband processor can be inhibited.

(8) A front-end integrated circuit according to an embodiment is a front-end integrated circuit to be connected to a baseband processor and a plurality of antenna elements, the front-end integrated circuit including: a plurality of variable phase shifters provided so as to correspond to the plurality of antenna elements, respectively; and a controller, wherein the controller is configured to receive a beam control signal indicating a direction of an antenna beam formed by the plurality of antenna elements, from the baseband processor, determine a phase control amount for each variable phase shifter on the basis of the beam control signal, and control each variable phase shifter on the basis of the determined phase control amount. According to this configuration, the control of each variable phase shifter is performed by the controller of the front-end integrated circuit, and the baseband processor does not need to control each variable phase shifter. Thus, even when the baseband processor performs beam control, an increase in control load on the baseband processor can be inhibited.

2. Details of Embodiments 2.1 Mobile Station of First Embodiment

FIG. 1 shows a vehicle 20 equipped with a mobile station 10. The mobile station 10 of the embodiment is an on-vehicle mobile station. However, the mobile station 10 does not have to be mounted on the vehicle 20. The mobile station 10 communicates with a mobile communication base station 30. The mobile communication base station 30 (hereinafter, also referred to merely as base station 30) is installed at a relatively high place such as the roof of a building or an upper portion of a steel tower, and communicates with a mobile station on the ground. To achieve high-speed communication, mobile communication is preferably communication in which millimeter waves or submillimeter waves are used. The mobile communication in which millimeter waves or submillimeter waves are used is, for example, fifth-generation mobile network (5G).

In the communication in which millimeter waves or submillimeter waves are used, propagation loss is great due to a high frequency. In the mobile communication of the present embodiment, beam forming is performed to compensate for propagation loss. By performing beam forming, directivity toward a specific direction can be achieved, and gain can be improved. In the present embodiment, beam forming is performed not only by the base station 30 but also by the mobile station 10, whereby high-speed communication is enabled. In order to perform beam forming, the mobile station 10 has an array antenna 100 having a plurality of antenna elements.

The vehicle 20 is a vehicle in transportation such as a bus and a train. The mobile station 10 according to the embodiment is connected to a wireless LAN wireless unit 40. The wireless LAN wireless unit 40 is a wireless LAN access point and provides wireless LAN service to a wireless LAN terminal 50 within the vehicle. The wireless LAN terminal 50 within the vehicle is, for example, a mobile phone, a smartphone, a tablet, a notebook computer, or the like carried by a passenger of the vehicle 20. The wireless LAN terminal 50 carried by the passenger is able to make an internet connection via a wireless LAN and a mobile communication network. The wireless LAN wireless unit 40 maybe provided within a casing different from a casing of the mobile station 10, or may be provided within the casing of the mobile station 10.

Figure 2:
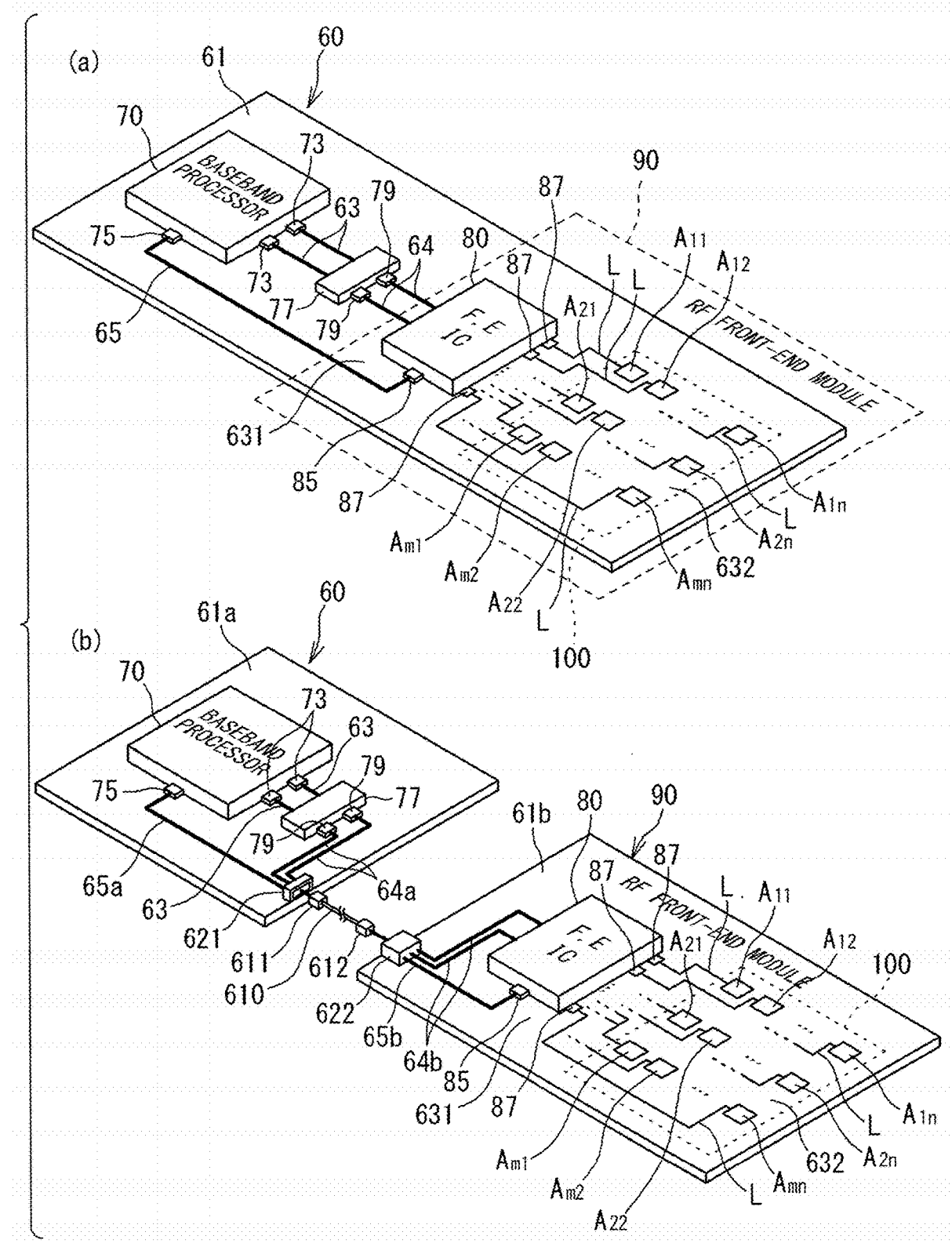
FIG. 2 shows perspective views of mobile station modules.

In FIG. 2, (a) shows a mobile station module 60 provided within the mobile station 10. The mobile station module 60 is provided within a casing that is not shown. The casing in which the mobile station module 60 is provided is attached to the vehicle 20. The mobile station 10 is attached, for example, to a ceiling 20a of the vehicle 20, for communication with the base station 30 outside the vehicle 20. The mobile station 10 may be installed on a side surface of the vehicle 20.

In the embodiment, the mobile station module 60 includes a baseband processor 70. The baseband processor 70 is mounted on a substrate 61. The baseband processor 70 is a semiconductor integrated circuit that executes a mobile communication process including a baseband process. The mobile communication process is a process required for mobile communication with the base station 30.

In the embodiment, the baseband process includes generating a baseband signal and outputting the baseband signal for transmission through a digital signal process. The baseband processor 70 outputs the baseband signal to an RF front-end module 90. The RF front-end module 90 performs a transmission RF signal process such as modulation and amplification and transmits an RF signal.

The RF front-end module 90 provides a baseband signal obtained by performing a reception RF signal process such as amplification and demodulation of a received RF signal, to the baseband processor 70. In the embodiment, the baseband process by the baseband processor 70 includes processing the baseband signal provided from the RF front-end module 90.

The RF front-end module 90 of the embodiment includes a front-end integrated circuit (front-end IC: FEIC) 80 and a plurality of antenna elements $A_{11}, \ldots, A_{mn}$. The front-end IC 80 is mounted on the substrate 61. In the embodiment, the front-end IC 80 is connected to the baseband processor 70 via a transceiver (transmitter-receiver) 77.

The transceiver 77 is mounted on the substrate 61. The transceiver 77 modulates the baseband signal provided from the baseband processor 70, into an RF signal. The transceiver 77 outputs the RF signal to the front-end IC 80. The front-end IC 80 performs a signal process such as phase control and amplification on the RF signal provided from the transceiver 77, and outputs the RF signal subjected to the signal process, to the antenna elements $A_{11}, \ldots, A_{mn}$. In addition, the front-end IC 80 performs a signal process such as amplification and phase control on the RF signal received by the antenna elements $A_{11}, \ldots, A_{mn}$. The front-end IC 80 outputs the RF signal subjected to the signal process, to the transceiver 77. The transceiver 77 demodulates the RF signal into the baseband signal. The transceiver 77 outputs the baseband signal to the baseband processor 70. The front-end IC 80 may include the transceiver 77 therein. In this case, the front-end IC is directly connected to the baseband processor 70.

In the embodiment, the signal process by the front-end IC 80 includes phase control for changing the direction of an antenna beam. The front-end IC 80 may perform amplitude control in addition to the phase control, in order to change the direction of an antenna beam. The phase control, etc., will be described later.

The baseband processor 70 has terminals 73 for inputting and outputting baseband signals. In addition, the front-end IC 80 has terminals 83 for inputting and outputting RF signals (see FIG. 3). The terminals 73 of the baseband processor 70 and the terminals 83 of the front-end IC 80 are connected to each other by signal lines (wires) 63 and 64 formed on the substrate 61, via the transceiver 77. In the case where the front-end IC 80 includes the transceiver 77 therein, the terminals 83 are terminals for inputting and outputting baseband signals from and to the baseband processor 70.

The plurality of antenna elements $A_{11}, \ldots, A_{mn}$ of the embodiment form the array antenna 100. Antenna beams are formed by the plurality of antenna elements $A_{11}, \ldots, A_{mn}$. The plurality of antenna elements $A_{11}, \ldots, A_{mn}$ of the embodiment are formed on the substrate 61. Here, "n" and "m" are each an integer that is not less than 1. In the embodiment, the number of the antenna elements $A_{11}, \ldots, A_{mn}$ included in the array antenna 100 is m×n. As the number of the antenna elements $A_{11}, \ldots, A_{mn}$ becomes larger, higher gain can be obtained. The arrangement of the antenna elements $A_{11}, \ldots, A_{mn}$ shown in FIG. 2 is a two-dimensional arrangement of m×n, but may be a three-dimensional arrangement, or may be a one-dimensional arrangement.

The antenna elements $A_{11}, \ldots, A_{mn}$ of the embodiment are planar antenna elements formed on the substrate 61. As the planar antenna, for example, patch antenna elements can be used. The patch antenna elements are formed on the surface of the substrate 61 that is a dielectric. As the substrate 61, for example, a flexible printed board can be used.

The plurality of antenna elements $A_{11}, \ldots, A_{mn}$ are connected to the front-end IC 80 by feeder lines. The front-end IC 80 has output terminals 87, the number of which corresponds to the number of the plurality of antenna elements $A_{11}, \ldots, A_{mn}$. A plurality of feeder lines L that connect the plurality of antenna elements $A_{11}, \ldots, A_{mn}$ and the plurality of output terminals 87 to each other are formed on the substrate 61. The feeder lines L of the embodiment are microstrip lines formed on the substrate 61, which is a dielectric.

In (a) in FIG. 2, the front-end IC 80 and the plurality of antenna elements $A_{11}, \ldots, A_{mn}$ in are integrated with each other by the substrate 61. That is, in the RF front-end module 90 of the embodiment, the front-end IC 80 and the plurality of antenna elements $A_{11}, \ldots, A_{mn}$ are integrated with each other by the common substrate 61. Due to the integration of the front-end IC 80 and the plurality of antenna elements $A_{11}, \ldots, A_{mn}$, it is not necessary to connect the front-end IC 80 and the plurality of antenna elements $A_{11}, \ldots, A_{mn}$ to each other by cables. Since cables become unnecessary, it is possible to reduce the size of the mobile station 10. In addition, since cables become unnecessary, occurrence of loss of signal power by cables can be avoided.

In (a) in FIG. 2, the RF front-end module 90 and the baseband processor 70 are integrated with each other by the substrate 61. That is, in the mobile station module 60 of the embodiment, the RF front-end module 90 and the baseband processor 70 are integrated with each other by the common substrate 61.

As shown in (b) in FIG. 2, the baseband processor 70 may be mounted on a substrate 61a that is different from a substrate 61b on which the RF front-end module 90 is provided. In this case, the baseband processor 70 and the RF front-end module 90 are connected to each other via a cable 610. The cable 610 includes insertion connectors 611 and 612 at both ends thereof. The insertion connectors 611 and 612 are inserted into reception-side connectors 621 and 622 provided to the substrates 61a and 61b. The reception-side connector 621 of the substrate 61a is connected to the terminals 73 and 75 provided to the baseband processor 70, via wires 63 and 64a formed on the substrate 61a and the transceiver 77. The reception-side connector 622 of the substrate 61b is connected to the terminals 83 and 85 provided to the front-end IC 80, via wires 64b formed on the substrate 61b.

In FIG. 2, the substrates 61, 61a, and 61b each have a planar shape, but may have a three-dimensional shape. In FIG. 2, in the substrate 61 or 61b, a first surface 631 of the substrate 61 or 61b in a range where the front-end IC 80 is provided is flush with a second surface 632 of the substrate 61 or 61b in a range where the antenna elements $A_{11}, \ldots, A_{mn}$ are provided, but may intersect each other, for example. The first surface 631 and the second surface 632 may be located at positions that are different from each other in the thickness direction of the substrate.

Figure 3:
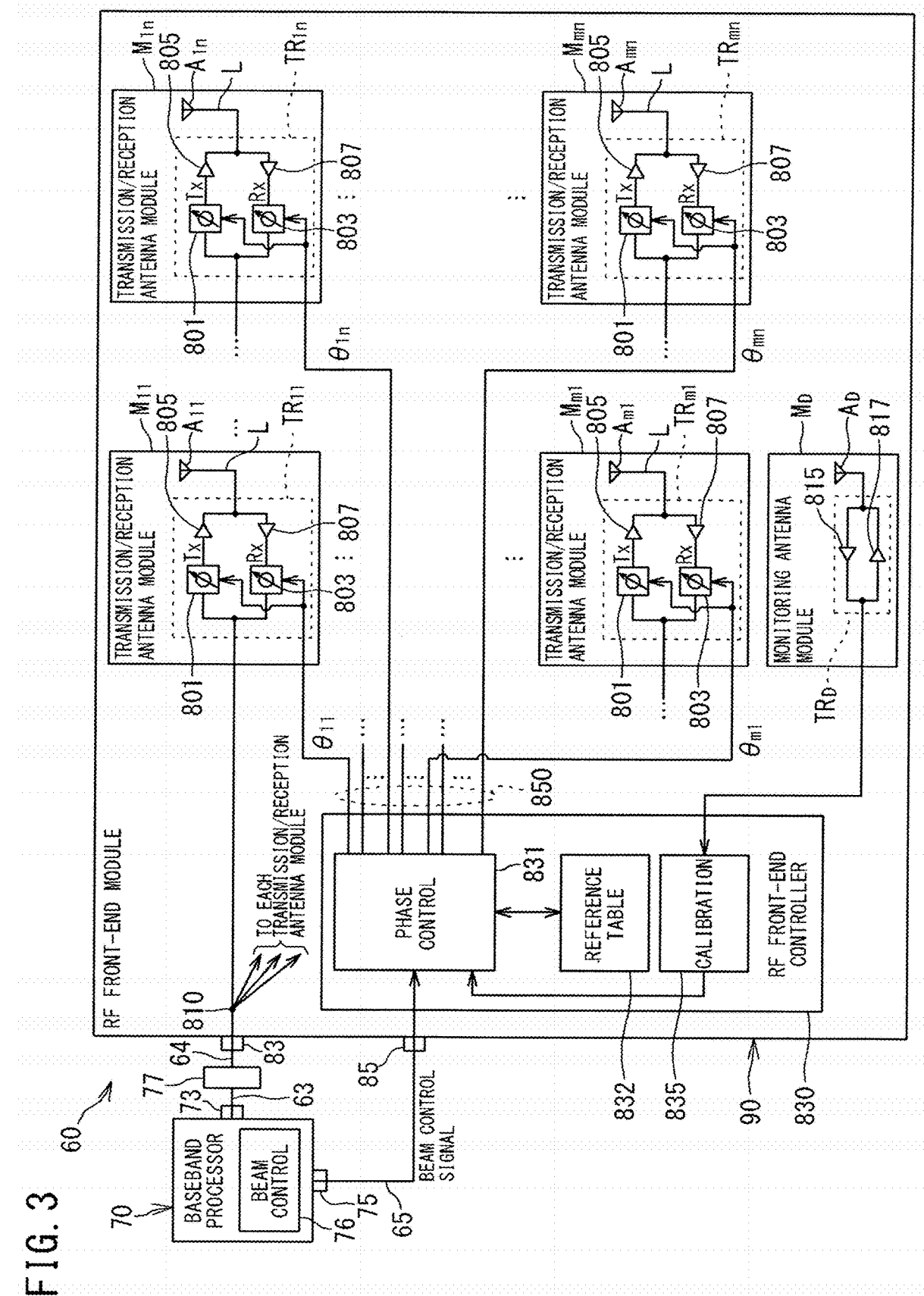
FIG. 3 is a circuit diagram of an RF front-end module.

As shown in FIG. 3, the mobile communication process by the baseband processor 70 of the embodiment includes a process 76 of controlling an antenna beam (beam control). Hereinafter, the "process of controlling an antenna beam" is referred to merely as "beam control". The beam control 76 is performed, for example, to direct an antenna beam toward the base station 30 that is a communication partner. The baseband processor 70 can recognize the direction in which the base station 30 is present, through a mobile communication process with the base station 30, and thus determines an appropriate direction of the antenna beam on the basis of the direction in which the base station 30 is present. By the appropriate beam control 76, high-speed communication is enabled.

For changing the direction of the beam, phase control 831 of transmission and reception signals is required. In the phase control, a plurality of variable phase shifters 801 and 803 connected to the plurality of antenna elements $A_{11}, \ldots, A_{mn}$ are controlled. In order to control the variable phase shifters 801 and 803, a process of determining a phase control amount for each of the variable phase shifters 801 and 803 and adjusting a phase on the basis of the phase control amount, is required.

In the beam control 76 of the embodiment, the phase control 831 is not performed. That is, the baseband processor 70 of the embodiment determines a direction of the antenna beam and provides a beam control signal indicating the direction of the antenna beam, to the RF front-end module 90, but does not perform the phase control 831 corresponding to the direction of the antenna beam. Since the baseband processor 70 does not perform the phase control 831 that requires controlling the plurality of variable phase shifters 801 and 803, the processing load on the baseband processor 70 is reduced. The processing load reduction effect is particularly enhanced when the number of the variable phase shifters 801 and 803 is increased. The beam control signal indicates the direction of the antenna beam, but does not directly indicate a phase adjustment amount for each of the plurality of variable phase shifters.

The front-end IC 80 of the embodiment performs the phase control 831 on the basis of the direction of the antenna beam determined by the baseband processor 70. In the phase control 831, a phase control amount for each of the plurality of variable phase shifters is determined, and each variable phase shifter is controlled. For the phase control 831, the front-end IC 80 receives the beam control signal indicating the direction of the antenna beam determined by the baseband processor 70, from the baseband processor 70.

The baseband processor 70 includes the terminal 75 for outputting the beam control signal. The front-end IC 80 includes the terminal 85 to which the beam control signal is inputted. In (a) in FIG. 2, the terminal 75 and the terminal 85 are connected to each other by a wire 65 formed on the substrate 61. In (b) in FIG. 2, the terminal 75 and the terminal 85 are connected to each other by wires 65a and 65b and the cable 610.

The beam control signal only needs to be a simple signal indicating the direction of a beam. Thus, for example, it is sufficient that one wire be provided as the wire 65 for a beam control signal. In this case, the number of terminals 75 to which the wire 65 is connected may be one, and thus it is possible to reduce the size of the baseband processor 70. In addition, the wire 65 through which the beam control signal flows may connect the baseband processor 70 and the front-end IC 80 to each other, and thus it is easy to reduce the size of the mobile station module 60.

If the baseband processor 70 directly controls a large number of variable phase shifters, a large number of wires or cables leading from the baseband processor 70 to the variable phase shifters are required. Accordingly, the number of terminals that should be provided to the baseband processor 70 is also increased. When the numbers of wires and terminals increase, a larger space is required, resulting in the size of the mobile station module 60 being increased. However, when an increase in the numbers of wires and terminals is inhibited, it is possible to reduce the size of the mobile station module 60.

As shown in FIG. 3, the RF front-end module 90 includes a plurality of antenna modules $M_{11}, \ldots, M_{mn}$. Each antenna module of the embodiment is used for transmission and reception. The plurality of antenna modules $M_{11}, \ldots, M_{mn}$ include transmission/reception circuits $TR_{11}, \ldots, TR_{mn}$ and the antenna elements $A_{11}, \ldots, A_{mn}$, respectively. The circuit of the RF front-end module 90 shown in FIG. 3, excluding the antenna elements $A_{11}, \ldots, A_{mn}$ and the feeder lines L, corresponds to an internal circuit of the front-end IC 80.

The RF front-end module 90 (front-end IC 80) shown in FIG. 3 includes a distributor/combiner 810. The distributor/combiner 810 is connected to the plurality of transmission/reception circuits $TR_{11}, \ldots, TR_{mn}$. The transmission RF signal generated by the transceiver 77 is distributed to the plurality of transmission/reception circuits $TR_{11}, \ldots, TR_{mn}$ by the distributor/combiner 810. The phase of the transmission RF signal is adjusted by the variable phase shifters 801 of the transmission/reception circuits $TR_{11}, \ldots, TR_{mn}$. The amplitude of the antenna element transmission RF signal may be adjusted. The variable phase shifters 801 are connected to the antenna elements $A_{11}, \ldots, A_{mn}$ via amplifiers 805. The transmission RF signal having the adjusted phase is amplified by the amplifiers 805 and transmitted from the antenna elements $A_{11}, \ldots, A_{mn}$.

Reception RF signals received by the respective antenna elements $A_{11}, \ldots, A_{mn}$ are provided to the corresponding transmission/reception circuits $TR_{11}, \ldots, TR_{mn}$. The reception RF signals are amplified by amplifiers 807 of the transmission/reception circuits $TR_{11}, \ldots, TR_{mn}$. The variable phase shifters 803 of the transmission/reception circuits $TR_{11}, \ldots, TR_{mn}$ are connected to the antenna elements $A_{11}, \ldots, A_{mn}$ via the amplifiers 807. The phases of the reception RF signals are adjusted by the variable phase shifters 803. The amplitudes of the reception RF signals may be adjusted. The reception RF signals outputted from the plurality of transmission/reception circuits $TR_{11}, \ldots, TR_{mn}$ are combined by the distributor/combiner 810. The front-end IC 80 outputs the reception RF signal resulting from the combination, to the transceiver 77. The transceiver 77 demodulates the reception RF signal resulting from the combination, into the baseband signal.

The RF front-end module 90 (front-end IC 80) includes a controller 830. The controller 830 serves to perform control in the RF front-end module 90 (front-end IC 80). The controller 830 includes a processor and a memory. In the memory, a computer program is stored. The computer program is executed by the processor. By execution of the computer program, the controller 830 performs its functions.

The controller 830 receives the beam control signal outputted from the baseband processor 70. For beam control, the controller 830 performs the phase control 831 on the basis of the beam control signal. In the phase control 831, phase control amounts for the respective variable phase shifters 801 and 803 of the plurality of antenna modules $M_{11}, \ldots, M_{mn}$ are determined on the basis of the beam control signal.

In the phase control 831, for example, a reference to a reference table 832 shown in FIG. 4 is made on the basis of the beam control signal, and phase control amounts for the respective variable phase shifters 801 and 803 corresponding to a value indicated by the beam control signal are determined. The value indicated by the beam control signal is, for example, a beam angle.

The reference table 832 shown in FIG. 4 is stored in the memory of the controller 830. In the reference table 832 shown in FIG. 4, a beam angle 201, which is the direction of the beam indicated by the beam control signal, and a phase control amount 202 are associated with each other. The phase control amount 202 in the reference table 832 is a phase control amount 202 for directing an antenna beam at a beam angle. In the reference table 832, the beam angle 201 and an amplitude control amount may be associated with each other.

In the reference table 832, the phase control amount (amplitude control amount) 202 is set for each of the variable phase shifters 801 and 803 of the plurality of antenna modules $M_{11}, \ldots, M_{mn}$. In FIG. 4, for example, when the beam angle is 15°, $\theta_{11}^{15}, \ldots \theta_{mn}^{15}$ are set as the phase control amounts for the respective variable phase shifters 801 and 803 of the antenna modules $M_{11}, \ldots, M_{mn}$. For other beam angles, phase control amounts corresponding to the beam angles are similarly set.

By referring to the reference table 832, the controller 830 can easily determine phase control amounts $\theta_{11}, \ldots \theta_{mn}$ corresponding to the beam angle 201 indicated by the beam control signal.

In the phase control 831, the variable phase shifters 801 and 803 are also controlled on the basis of the determined phase control amounts $\theta_{11}, \ldots \theta_{mn}$. As shown in FIG. 3, in controlling the variable phase shifters 801 and 803, the controller 830 outputs phase control signals $\theta_{11}, \ldots, \theta_{mn}$ to the respective variable phase shifters 801 and 803 of the antenna modules $M_{11}, \ldots, M_{mn}$. The phase control signals $\theta_{11}, \ldots, \theta_{mn}$ shown in FIG. 3 indicate the phase control amounts $\theta_{11}, \ldots, \theta_{mn}$ determined by the controller 830. The variable phase shifters 801 and 803 adjust the phases of transmission signals or reception signals on the basis of the provided phase control signals $\theta_{11}, \ldots, \theta_{mn}$.

The controller 830 is connected to the respective variable phase shifters 801 and 803 of the plurality of antenna modules $M_{11}, \ldots, M_{mn}$ via a plurality of phase control signal lines 850. The phase control signals $\theta_{11}, \ldots, \theta_{mn}$ are provided to the variable phase shifters 801 and 803 via the phase control signal lines 850. In the embodiment, the signal lines 850 are formed within the front-end IC 80, which is an integrated circuit. Thus, even when the number of the phase control signal lines 850 is large, a size increase is inhibited as compared to the case where the phase control signal lines 850 are formed on the substrate 61.

In FIG. 3, one phase control signal line 850 is connected to both of the two variable phase shifters 801 and 803 included in one transmission/reception circuit $TR_{11}, \ldots, TR_{mn}$. However, one signal line may be connected to one variable phase shifter. That is, phases may be adjusted independently in a transmission system and a reception system, respectively. In addition, for beam control, the controller 830 may perform signal amplitude control on the basis of the beam control signal. In this case, the controller 830 and attenuators included in the respective transmission/reception circuits $TR_{11}, \ldots, TR_{mn}$ are connected to each other by amplitude control signal lines.

The RF front-end module 90 shown in FIG. 3 also includes a monitoring antenna module $M_D$. Similar to the transmission/reception antenna modules $M_{11}, \ldots, M_{mn}$, the monitoring antenna module $M_D$ has an antenna element $A_D$ and a transmission/reception circuit $TR_D$. The antenna element $A_D$ is provided on the substrate 61 outside the front-end IC 80, and the transmission/reception circuit $TR_D$ is provided within the front-end IC 80. The transmission/reception circuit $TR_D$ has amplifiers 815 and 817, for example.

For monitoring, the monitoring antenna module $M_D$ receives monitoring RF signals transmitted from the transmission/reception antenna modules $M_{11}, \ldots, M_{mn}$. The RF signals received by the monitoring antenna module $M_D$ are provided to the controller 830. The controller 830 monitors whether the signals have been outputted with phases corresponding to the phase control amounts determined by the controller 830, and performs a calibration process 835 of correcting the phase control amounts, as necessary. Accordingly, whether the transmission/reception circuits and the antenna elements are properly operating can be monitored. In the embodiment, the calibration process 835 is performed by the controller 830 within the RF front-end module 90 (front-end IC 80), and thus it is not necessary to provide a monitoring signal to the baseband processor 70. Since the baseband processor 70 does not monitor a monitoring signal, the processing load on the baseband processor 70 is reduced.

In monitoring the transmission/reception circuits and the antenna elements, a monitoring RF signal transmitted from the monitoring antenna module $M_D$ may be received by the transmission/reception antenna modules $M_{11}, \ldots, M_{mn}$. In this case, the received monitoring RF signal may be provided to the controller 830, and the controller 830 may perform the calibration process 835 such as correction of phase control amounts.

2.2 Mobile Station of Second Embodiment

FIG. 5 to FIG. 8 show a mobile station of a second embodiment. It should be noted that those points that are not particularly described in the second embodiment are the same as those in the first embodiment.

Figure 5:
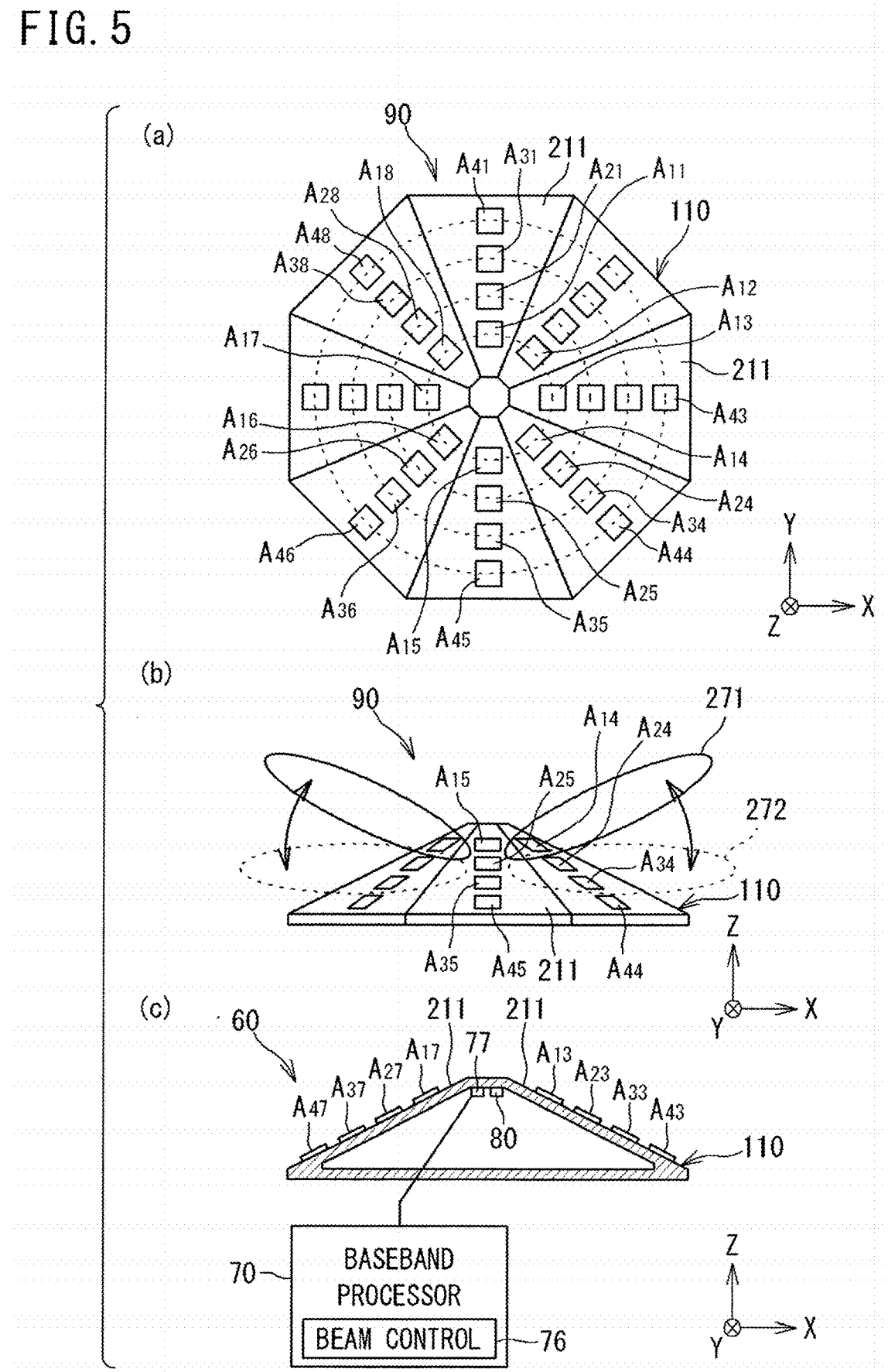

FIG. 5 shows an RF front-end module 90 of the mobile station of the second embodiment. In FIG. 5, (a) is a plan view of the RF front-end module 90, (b) is a side view of the RF front-end module 90, and (c) is a cross-sectional view of the RF front-end module 90.

The RF front-end module 90 in FIG. 5 has a base 110. The base 110 shown in FIG. 5 is attached to a vehicle. The base 110 is attached, for example, to a ceiling of the vehicle. The base 110 is attached to the vehicle, for example, by means of a fastening tool such as a bolt, an adhesive, welding, or the like. The base 110 is a support for a plurality of antenna elements $A_{11}, \ldots A_{48}$.

The antenna elements $A_{11}, \ldots A_{48}$ are, for example, patch antenna elements. The patch antenna elements are formed on the surface of a dielectric substrate, and thus the base 110 is formed by the dielectric substrate. As the dielectric substrate, a flexible printed wiring board can be used. In FIG. 5, the base 110 and the plurality of antenna elements $A_{11}, \ldots A_{48}$ are exposed, but are preferably covered with and protected by a radome that is not shown.

In (c) in FIG. 5, the transceiver 77 and the front-end IC 80 are mounted on the base 110, which is a substrate. Also in the second embodiment, the front-end IC 80 and the antenna elements $A_{11}, \ldots A_{48}$ are connected to each other by feeder lines (for example, microstrip lines) formed on the base 110, which is a substrate. In (c) in FIG. 5, the transceiver 77 and the front-end IC 80 are provided within the base 110, but may be provided on the outer surface of the base 110. In addition, the baseband processor 70 may be provided to the base 110, or may be provided to a substrate different from the base 110. The transceiver 77 may also be provided to a substrate different from the base 110.

As shown in FIG. 5, in the second embodiment, the base 110, which supports the antenna elements $A_{11}, \ldots A_{48}$, has a pyramid shape. The pyramid may be a polygonal pyramid (a pyramid having a polygonal base with n sides) or, the shape of the base 110 may be a cone. Examples of the pyramid or cone include a complete pyramid or cone and a frustum. The frustum may be a truncated pyramid, or may be a truncated cone.

The base 110 shown in FIG. 5 has an octagonal pyramid shape (n=8) and has eight inclined surfaces 211. A plurality of antenna elements are arranged on the inclined surfaces 211 of the base 110. The antenna elements are formed on the respective eight (n) inclined surfaces 211. Four (a plurality of) antenna elements are arranged on each inclined surface 211 in a line in the radial direction along the inclined surface.

In FIG. 5, eight antenna elements are arranged at each of four height positions in the vertical direction (Z direction). Focusing on eight antenna elements at the same height (for example, the antenna elements $A_{11}, A_{12}, A_{13}, A_{14}, A_{15}, A_{16}, A_{17}$, and $A_{18}$), the eight antenna elements are arranged at equal intervals circumferentially on a horizontal plane. The circumferential positions of the antenna elements at each stage in the vertical direction are uniform. In FIG. 5, a circumferential angle θ between any two antenna elements adjacent to each other in the circumferential direction is 45°. The eight antenna elements at the same height can be considered to be arranged in an octagonal ring shape on the horizontal plane.

As shown in FIG. 5, the antenna elements at each stage in the vertical direction are arranged at equal intervals circumferentially on the horizontal plane. The antenna elements $A_{21}, \ldots, A_{28}$ at the second stage from the upper side are arranged radially outward of the antenna elements $A_{11}, \ldots, A_{18}$ at the uppermost stage so as to draw a circumference larger than a circumference drawn by the antenna elements $A_{11}, \ldots, A_{18}$. Similarly, the antenna elements $A_{31}, \ldots, A_{38}$ at the third stage from the upper side are arranged radially outward of the antenna elements $A_{21}, \ldots, A_{28}$ at the second stage, and the antenna elements $A_{31}, \ldots, A_{38}$ at the fourth stage from the upper side are arranged radially outward of the antenna elements $_{31}, \ldots, A_{38}$ at the third stage.

Since the antenna elements $A_{11}, \ldots A_{48}$, which are planar antenna elements (patch antenna elements), are formed on the inclined surfaces 211, the surface directions of the antenna elements $A_{11}, \ldots A_{48}$ are inclined. Therefore, the antenna elements $A_{11}, \ldots A_{48}$ each have directivity in the radially outward direction on the horizontal plane and in an obliquely upward direction on a vertical plane.

In the second embodiment, since the antenna elements $A_{11}, \ldots A_{48}$ are arranged on the inclined surfaces 211, an antenna front direction in which high gain is easily obtained is directed obliquely upward. The base station 30 is generally located at a high place. Thus, when the antenna front direction is directed obliquely upward, high gain is easily obtained in communication with the base station 30 as compared to the case where the antenna front direction is the vertical direction or the horizontal direction.

From the viewpoint of arranging the plurality of antenna elements circumferentially, the base 110 may be formed in a tubular shape. The base 110 may have a cylindrical shape, or may have a polygonal tubular shape (a polygonal tubular shape having n sides: "n" is an integer not less than 3). A polygonal shape is approximated to a circle, and thus the antenna elements can be arranged circumferentially even when the base 110 has a polygonal tubular shape. The value of "n" is not particularly limited, but "n" is preferably not less than 6, more preferably not less than 12, and further preferably not less than 24. When "n" is higher, it is easier to respond to all directions on the horizontal plane.

Regarding the circumferential arrangement of the antenna elements, a part of each antenna element (preferably, a center thereof in the antenna horizontal direction) suffices to be located on a virtual circumference, and the entirety of each antenna element does not have to be arranged on the virtual circumference. When the support has a cylindrical shape, it is easy to arrange the entirety of each antenna element on the virtual circumference.

Figure 6:
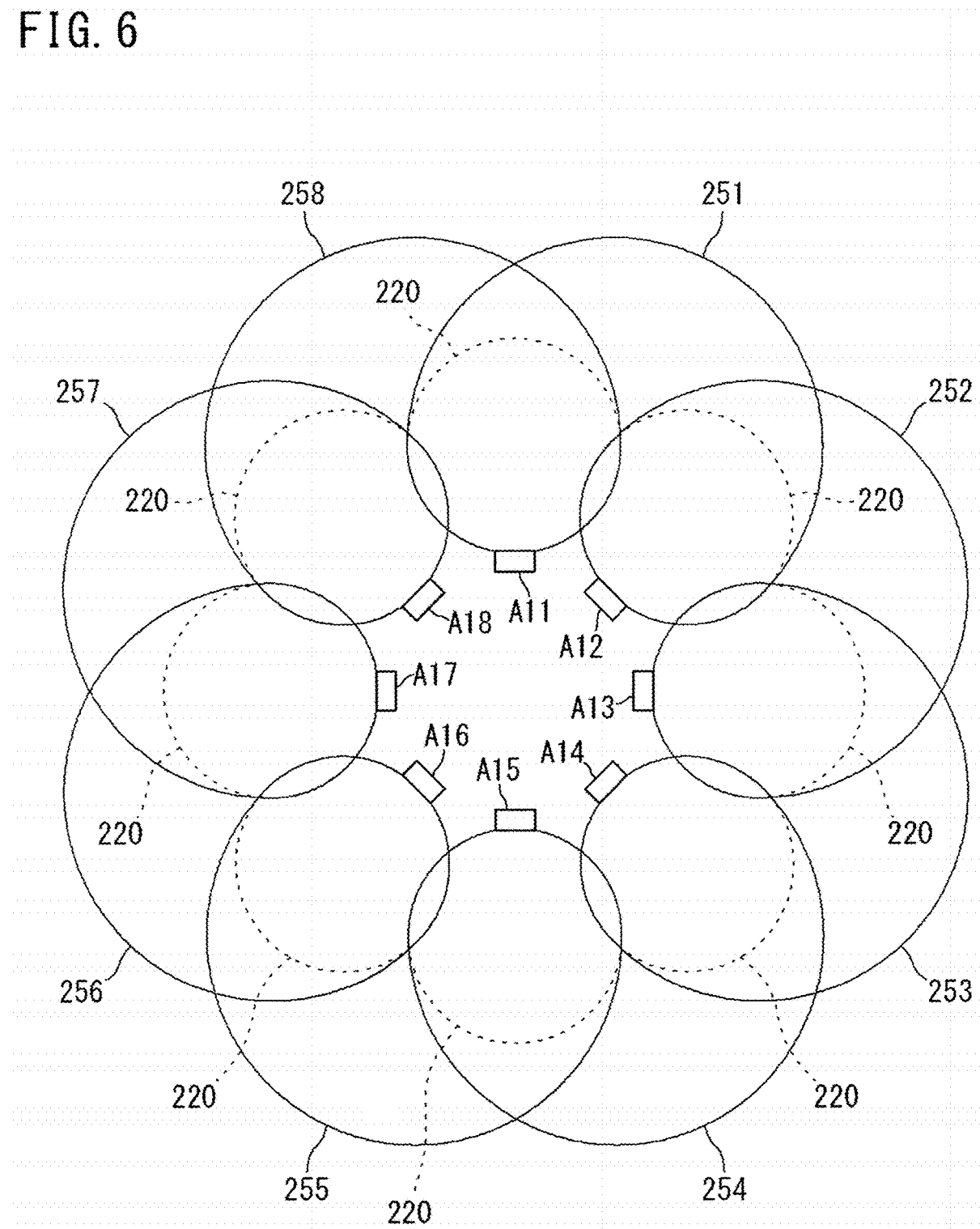
FIG. 6 illustrates antenna beams.

In FIG. 6, reference sign 220 denotes the directivity of a beam 220 formed by one antenna element. In FIG. 6, only the eight antenna elements $A_{11}, A_{12}, A_{13}, A_{14}, A_{15}, A_{16}, A_{17}$, and $A_{18}$ at the same height in the vertical direction are shown. The antenna elements $A_{21}, \ldots, A_{48}$ at the other heights also have the same directivity at each stage.

As shown in FIG. 6, the horizontal beam widths of the beams 220 formed by the respective antenna elements $A_{11}, \ldots, A_{18}$ are set such that the beams 220 overlap each other in the circumferential direction on the horizontal plane. Therefore, by using the plurality of antenna elements $A_{11}, \ldots, A_{18}$ in the circumferential direction, a beam can be directed in all directions on the horizontal plane. Here, the phrase "a beam can be directed in all directions on the horizontal plane" includes a beam being directed in any direction included in all directions on the horizontal plane by using only any of the plurality of antenna elements $A_{11}, \ldots, A_{18}$ in the circumferential direction, and also includes a non-directional beam being directed in all directions on the horizontal plane by using all of the plurality of antenna elements $A_{11}, \ldots, A_{18}$ in the circumferential direction.

In FIG. 6, reference signs 251, 252, 253, 254, 255, 256, 257, and 258 denote antenna beams in the case where some antenna elements of the plurality of antenna elements $A_{11}, \ldots, A_{18}$ in the circumferential direction are used. For example, reference sign 251 denotes a beam formed in the case where the antenna element $A_{11}$ and the antenna element $A_{12}$ are selected as antenna elements to be used.

Similarly, reference sign 252 denotes a beam formed in the case where the antenna element $A_{12}$ and the antenna element $A_{13}$ are selected as antenna elements to be used. Reference sign 253 denotes a beam formed in the case where the antenna element $A_{13}$ and the antenna element $A_{14}$ are selected as antenna elements to be used. Reference sign 254 denotes a beam formed in the case where the antenna element $A_{14}$ and the antenna element $A_{15}$ are selected as antenna elements to be used. Reference sign 255 denotes a beam formed in the case where the antenna element $A_{15}$ and the antenna element $A_{16}$ are selected as antenna elements to be used. Reference sign 256 denotes a beam formed in the case where the antenna element $A_{16}$ and the antenna element $A_{17}$ are selected as antenna elements to be used. Reference sign 257 denotes a beam formed in the case where the antenna element $A_{17}$ and the antenna element $A_{18}$ are selected as antenna elements to be used. Reference sign 258 denotes a beam formed in the case where the antenna element $A_{18}$ and the antenna element $A_{11}$ are selected as antenna elements to be used.

As shown in FIG. 6, beams in various directions in the circumferential direction can be formed by switching antenna elements to be used. In addition, by controlling the phases (amplitudes) of signals transmitted and received by a plurality of antenna elements to be used, the plurality of antenna elements to be used can be caused to serve as an array antenna. In this case, for example, the direction of the beam 251 can be changed from the direction shown in FIG. 6.

As described above, by changing the direction of the beam on the horizontal plane, stable communication with the base station 30 is enabled even when the base station is present in any direction from the mobile station 10.

In FIG. 6, change of the direction of the beam on the horizontal plane is shown. By using, as an array antenna, four antenna elements aligned along the inclined surface 211, the directivity on the vertical plane can be changed. By controlling a tilt angle, by which the directivity on the vertical plane is changed, in accordance with the relative positions of the mobile station 10 and the base station 30 in the vertical direction, high gain can be obtained in the direction to the base station 30, so that stable high-speed communication is enabled.

As described above, in the second embodiment, an antenna beam can be formed in desired directions on the horizontal plane and the vertical plane by selecting one or a plurality of antennas from among the plurality of antenna elements $A_{11}, \ldots A_{48}$ as antenna elements to be used. In addition, by causing a plurality of antenna elements to be used to serve as an array antenna, the direction of a beam formed by the plurality of antenna elements to be used can also be changed.

For free selection of antenna elements to be used, the RF front-end module 90 (front-end IC 80) of the second embodiment includes switches $SW_{11}, \ldots, SW_{48}$. The switches $SW_{11}, \ldots, SW_{48}$ are arranged, for example, between the distributor/combiner 810 and the respective antenna modules $M_{11}, \ldots, M_{48}$, and the plurality of switches $SW_{11}, \ldots, SW_{48}$ are provided so as to correspond to the plurality of antenna modules $M_{11}, \ldots, M_{48}$, respectively. When the switches $SW_{11}, \ldots, SW_{48}$ are turned ON, the corresponding antenna modules $M_{11}, \ldots, M_{48}$ are selected as antenna modules to be used. The antenna modules to be used are antenna modules to be used for transmitting or receiving an RF signal. When the switches $SW_{11}, \ldots, SW_{48}$ are turned OFF, the corresponding antenna modules $M_{11}, \ldots, M_{48}$ become antenna modules that are to be not used for transmitting or receiving an RF signal.

The controller 830 of the second embodiment performs switch control 831 for selecting one or a plurality of antenna modules to be used that are suitable for forming a beam corresponding to a beam control signal. Furthermore, the controller 830 of the second embodiment performs phase control 831 on signals transmitted or received by the antenna elements of a plurality of antenna modules to be used (a plurality of antenna elements to be used), thereby adjusting the direction of a beam formed by the antenna elements to be used.

For example, the controller 830 performs the switch control and phase control 831 by referring to a reference table shown in FIG. 8 on the basis of the beam control signal. In the second embodiment, since the beam is controllable on the horizontal plane and the vertical plane, the beam control signal is a signal indicating a horizontal plane beam angle and a vertical plane beam angle. The baseband processor 70 determines a horizontal plane beam angle and a vertical plane beam angle of the antenna beam in accordance with the direction in which the base station 30 is present, and outputs and provides a beam control signal indicating the determined horizontal plane beam angle and vertical plane beam angle, to the controller 830.

In the reference table 832 shown in FIG. 8, a phase control amount 202 and switch control information 203 are associated with each combination of a horizontal plane beam angle 201a and a vertical plane beam angle 201b. In the switch control information 203, among the antenna modules $M_{11}, \ldots, M_{48}$, "ON" is set for antenna modules selected as antenna modules to be used, and "OFF" is set for antenna modules that become antenna modules that are to be not used. Which antenna module becomes an antenna module to be used is set in accordance with a combination of the horizontal plane beam angle 201a and the vertical plane beam angle 201b.

In FIG. 8, "ALL" in the horizontal plane beam angle 201a indicates that all the antenna modules $M_{11}, \ldots, M_{48}$ are selected as antenna modules to be used. When all the antenna modules $M_{11}, \ldots, M_{48}$ are selected, the beam becomes non-directional on the horizontal plane.

In the phase control amount 202 in the reference table 832, a phase control amount corresponding to the horizontal plane beam angle 201a and the vertical plane beam angle 201b indicated by the beam control signal is set for an antenna module selected as an antenna module to be used. For an antenna module that is to be not used, a phase control amount is not set.

By referring to the reference table 832, the controller 830 can easily determine an antenna module to be used, and can easily determine phase control amounts $\theta_{11}, \ldots \theta_{mn}$ corresponding to the horizontal plane beam angle 201a and the vertical plane beam angle 201b indicated by the beam control signal.

Figure 7:
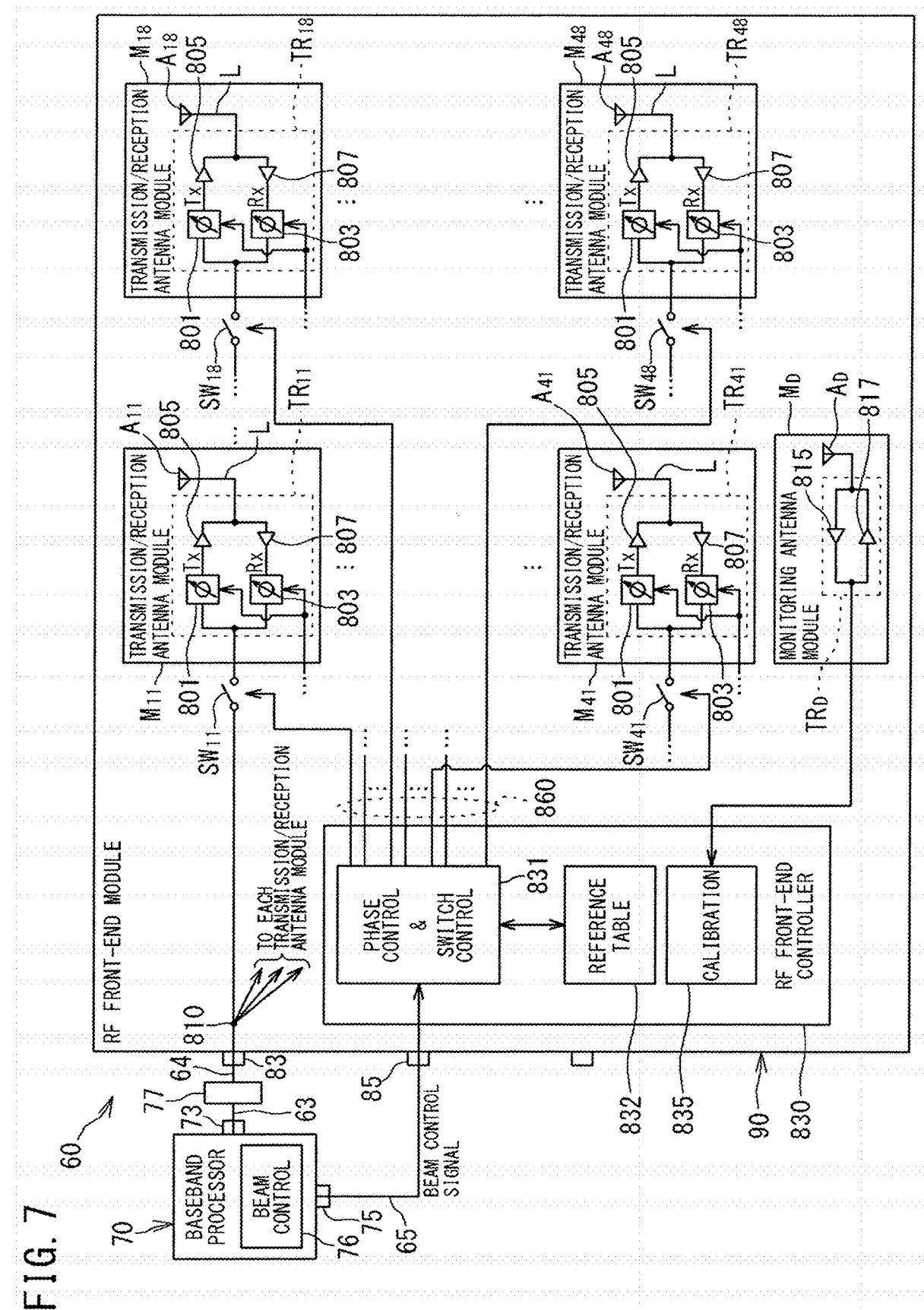
FIG. 7 is a circuit diagram of an RF front-end module.

The controller 830 performs control 831 of turning ON the switches corresponding to the selected antenna modules to be used and turning OFF the switches corresponding to the antenna modules that are to be not used. As shown in FIG. 7, the controller 830 is connected to the plurality of switches $SW_{11}, \ldots, SW_{48}$ via a plurality of switch control lines 860. The controller 830 outputs a switch control signal for turning ON the switches corresponding to the antenna modules to be used, and provides the switch control signal to the switches via the switch control lines 860.

Furthermore, the controller 830 also performs phase control 831 of adjusting the phases of the variable phase shifters 801 and 803 of each antenna module to be used, on the basis of the determined phase control amount $\theta_{11}, \ldots \theta_{mn}$. In FIG. 7, the phase control signal lines 850 are not shown, but are present similar to FIG. 3. In addition, also in the second embodiment, amplitude control may be performed.

Figure 9:
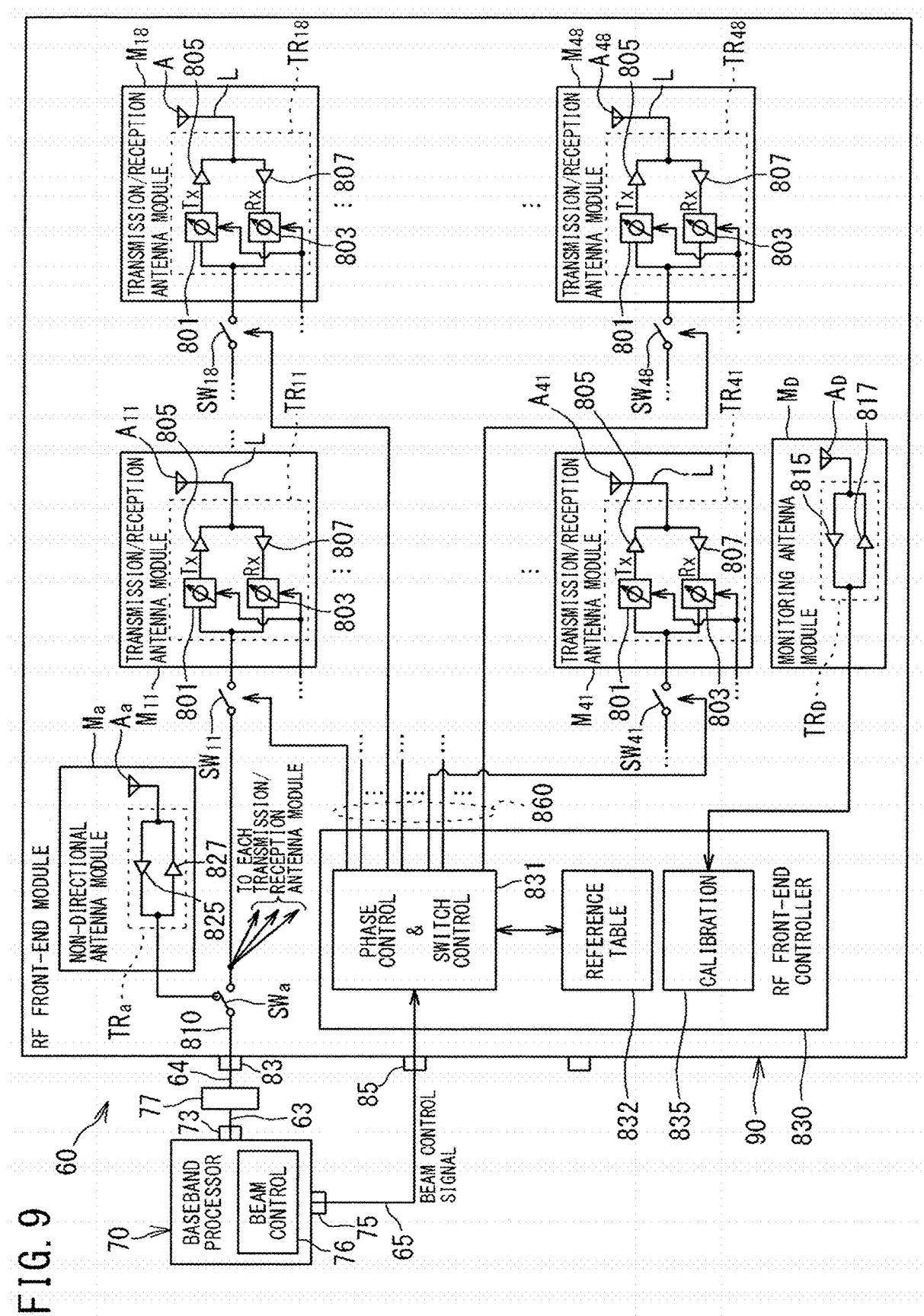
FIG. 9 is a circuit diagram of an RF front-end module.

FIG. 9 shows a modification of the second embodiment. An RF front-end module in FIG. 9 includes a non-directional antenna module Ma. The non-directional antenna module Ma has a non-directional antenna element Aa and a transmission/reception circuit TRa having amplifiers 825 and 827, etc. In addition, the RF front-end module in FIG. 9 includes a switch SWa. The switch SWa is used for selecting the non-directional antenna module Ma instead of the antenna modules $M_{11}, \ldots, M_{48}$ as an antenna module to be used. The switch SWa is controlled by the controller 830.

The controller 830 determines which to use between the non-directional antenna module Ma having the non-directional antenna element Aa, and the antenna modules $M_{11}, \ldots, M_{48}$ having the directivity antenna elements $A_{11}, \ldots, A_{48}$, as an antenna module to be used for communication. For example, when the beam control signal indicates a beam that is non-directional on the horizontal plane, the controller 830 controls the switch SWa and selects the non-directional antenna module Ma as an antenna module to be used for communication. Switch control and phase control performed when the antenna modules $M_{11}, \ldots, M_{48}$ are selected as antenna modules to be used for communication are as described above.

In the case where non-directivity is desired, more appropriate non-directivity can be obtained by using the non-directional antenna element Aa.

3. Additional Notes

The embodiments disclosed herein are merely illustrative and not restrictive in all aspects. The scope of the present disclosure is defined by the scope of the claims rather than the meaning described above, and is intended to include meaning equivalent to the scope of the claims and all modifications within the scope.

REFERENCE SIGNS LIST 10 mobile station
20 vehicle
20a ceiling
30 mobile communication base station
40 wireless LAN wireless unit
50 wireless LAN terminal
60 mobile station module
61, 61a, 61b substrate
63, 64 signal line
64a, 64b wire
65, 65a, 65b wire
70 baseband processor
73, 75 terminal
77 transceiver
80 front-end integrated circuit
83, 85 terminal
87 output terminal
90 RF front-end module
100 array antenna
110 base
211 inclined surface
610 cable
611, 612 insertion connector
621, 622 reception-side connector
631 first surface
632 second surface
801, 803 variable phase shifter
805 amplifier
807 amplifier
810 distributor/combiner
815, 817 amplifier
825, 827 amplifier
830 controller
832 reference table
835 calibration process
850 phase control signal line
860 switch control line
$A_{11}, \ldots, A_{mn}$ antenna element
L feeder line
$TR_{11}, \ldots, TR_{mn}$ transmission/reception circuit

The invention claimed is:

1. A mobile station comprising:
a baseband processor; and
an RF front-end module connected to the baseband processor and including a plurality of antenna modules and a controller, wherein
the plurality of antenna modules each include an antenna element and a variable phase shifter connected to the antenna element,
the baseband processor is configured to determine a direction of an antenna beam formed by the plurality of antenna elements and to output a beam control signal indicating the direction of the antenna beam to the controller, and
the controller is configured to receive the beam control signal from the baseband processor, determine a phase control amount for each variable phase shifter on the basis of the beam control signal, and output, to each variable phase shifter, a phase control signal based on the determined phase control amount.

2. The mobile station according to claim 1, wherein the controller selects one or a plurality of antenna modules to be used for communication, from among the plurality of antenna modules, on the basis of the beam control signal, and controls the variable phase shifters of the one or the plurality of antenna modules.

3. The mobile station according to claim 1, wherein the controller determines the phase control amount by referring to a table in which a direction of an antenna beam with a phase control amount for each variable phase shifter are associated with each other.

4. The mobile station according to claim 1, wherein the RF front-end module receives the beam control signal by only one terminal.

5. The mobile station according to claim 1, wherein the controller corrects the phase control amount by monitoring a phase of a signal transmitted or received by the antenna element.

* * * * *